US011016730B2

(12) United States Patent
Altshuller et al.

(10) Patent No.: US 11,016,730 B2
(45) Date of Patent: *May 25, 2021

(54) TRANSFORMING A TRANSACTIONAL DATA SET TO GENERATE FORECASTING AND PREDICTION INSIGHTS

(71) Applicant: International Business Machines Corporation, Armonk, NY (US)

(72) Inventors: Marc S. Altshuller, Toronto (CA); Yea Jane Chu, Chicago, IL (US); Jing-Yun Shyr, Naperville, IL (US); Michael D. Woods, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 901 days.

This patent is subject to a terminal disclaimer.

(21) Appl. No.: 15/221,988

(22) Filed: Jul. 28, 2016

(65) Prior Publication Data

US 2018/0032876 A1    Feb. 1, 2018

(51) Int. Cl.
*G06F 7/08*    (2006.01)
*G06F 16/25*    (2019.01)
(Continued)

(52) U.S. Cl.
CPC ............. *G06F 7/08* (2013.01); *G06F 16/258* (2019.01); *G06F 16/9024* (2019.01); *G06N 20/00* (2019.01)

(58) Field of Classification Search
CPC .... G06F 17/30592; G06F 7/08; G06F 16/258; G06F 16/9024; G06Q 10/063;
(Continued)

(56) References Cited

U.S. PATENT DOCUMENTS 5,257,365 A * 10/1993 Powers ............... G06F 16/2246
7,711,734 B2   5/2010 Leonard
(Continued)

FOREIGN PATENT DOCUMENTS

EP    1265173 A1    12/2002
EP    2284769 A1    2/2011
WO    2013051101 A1    4/2013

OTHER PUBLICATIONS

Kalankesh, Laleh Ranandeh, Fatemeh Mansouri, and Narges Khanjani. "Association of temperature and humidity with trauma deaths." Trauma monthly 20.4 (2015). (Year: 2015).*

(Continued)

*Primary Examiner* — Li B. Zhen
*Assistant Examiner* — Markus A. Vasquez
(74) *Attorney, Agent, or Firm* — Law Office of Jim Boice (57) ABSTRACT

A method, system, and/or computer program product analyses event transactional related data to generate insights and predictions, which are pre-created to efficiently respond to requests for prediction/forecasting information, in order to improve the operation of the prediction-generating computer. One or more processors receive a series of structured data, where each entry ($E_i$) from the series of structured data has one or more time fields $T_k$ and one or more attributes $A_j$. In response to determining that the series of structured data is transactional, one or more processors select a time field $T_{kr}$ that meets an aggregation criterion, and then aggregate the transactional data from the time field $T_{kr}$ into a time series data format. One or more processors consolidate results from a time series analysis and a regression analysis of the transformed transactional data to create a consolidated result, which is used to respond to a request for prediction/forecasting information.

13 Claims, 7 Drawing Sheets

(51) Int. Cl.
*G06F 16/901* (2019.01)
*G06N 20/00* (2019.01)

(58) Field of Classification Search
CPC .............. G06Q 10/04; G06Q 30/0202; G06Q 10/06393; G06N 20/00
See application file for complete search history.

(56) References Cited

U.S. PATENT DOCUMENTS

| | | | |
|---|---|---|---|
| 7,716,022 | B1 | 5/2010 | Park |
| 2002/0010663 | A1 | 1/2002 | Muller |
| 2004/0220771 | A1 | 11/2004 | Breiman |
| 2005/0246161 | A1 | 11/2005 | Sakurai |
| 2006/0010101 | A1 | 1/2006 | Suzuki et al. |
| 2006/0010142 | A1 | 1/2006 | Kim et al. |
| 2010/0287029 | A1 | 11/2010 | Dodge |
| 2012/0191642 | A1 | 7/2012 | George |
| 2013/0041644 | A1 | 2/2013 | Cremonesi |
| 2013/0205192 | A1* | 8/2013 | Spada ................ G06F 17/2264 715/227 |
| 2014/0019909 | A1 | 1/2014 | Leonard |
| 2014/0032506 | A1 | 1/2014 | Hoey et al. |
| 2014/0222744 | A1 | 8/2014 | Maag |
| 2014/0229233 | A1 | 8/2014 | Hu |
| 2015/0213631 | A1* | 7/2015 | Vander Broek ..... G06F 16/2477 345/589 |
| 2015/0379413 | A1* | 12/2015 | Robertson ............. G06N 5/048 706/11 |
| 2016/0108428 | A1 | 4/2016 | Baum et al. |
| 2017/0004331 | A1* | 1/2017 | Weldon .................... G06T 11/60 |
| 2017/0017903 | A1* | 1/2017 | Gray ......................... G06F 3/14 |
| 2017/0132313 | A1* | 5/2017 | Kukla ................... G06F 16/334 |
| 2017/0193049 | A1* | 7/2017 | Grehant ................. G06N 20/00 |
| 2018/0365715 | A1* | 12/2018 | Malhotra ............... G06N 5/043 |

OTHER PUBLICATIONS

P. Mell et al., "The NIST Definition of Cloud Computing", National Institute of Standards and Technology, Information Technology Laboratory, Sep. 2011, pp. 1-7.

List of IBM Patents and Patent Applications Treated as Related, Jul. 28, 2016.

Anonymous, "Automatic Catgorization of IT Infrastructure Service Management Data Using Natural Language Processing and Machine Learning,", IP.COM, IPCOM000245200D, Feb. 18, 2016, pp. 1-7.

Anonymous, "Method and System for Hierarchical, Multimodal, Real Time Decision Support", IP.COM, IPCOM000196694D, Jun. 11, 2010, pp. 1-4.

U.S. Appl. No. 15/459,568—Non-Final Office Action dated Sep. 18, 2018.

S. Ma et al., "Mining Partially Periodic Event Patterns With Unknown Periods", Proceedings of the 17th International Conference on Data Engineering, 2002, pp. 205-214.

M. Elefky et al., "Periodicity Detection in Time Series Databases", IEEE Transactions on Knowledge and Data Engineering, 17(7), 2005, pp. 875-887.

"Time Intervals Node", IBM, SPSS Modeler Documentation, Chapter 4: Field Operations Node <https://www.ibm.com/support/knowledgecenter/en/SS3RA7_18.1.0/modeler_mainhelp_client_ddita/clementine/timeintervalnode_general.html#timeintervalnode_general> , Retrieved March 6, 2019, 42 PP.

U.S. Appl. No. 15/459,568—Final Office Action dated Feb. 12, 2019.

U.S. Appl. No. 14/884,468—Non-Final Office Action dated Sep. 18, 2018.

U.S. Appl. No. 14/884,468—Final Office Action dated Feb. 12, 2019.

SAS Institute INC., "The Expand Procedure" SAS/ETS User's Guide, SAS Institute Inc., Cary, NC, USA, 2014, pp. 1-59.

A. Srinivasan, "Significant Interval and Episode Discovery in Time-Series Data", University of Texas at Arlington, Dec. 2003, 134 PP.

List of IBM Patents or Patent Applications Treated As Related, Mar. 7, 2019.

U.S. Appl. No. 15/459,568—Non-Final Office Action dated June 3, 2019.

U.S. Appl. No. 15/459,568—Non-Final Office Action dated May 30, 2019.

* cited by examiner

| ID | DATE OF OCCURANCE | LOCATION | MALICIOUS TYPE | LAST UPDATED |
|---|---|---|---|---|
| 173824 | 1/1/2016 0:00 | 1423 N 83rd AVE | A | 1/1/2016 0:00 |
| 173825 | 1/1/2016 1:07 | 1736 S 62nd AVE | C | 1/5/2016 9:37 |
| 173826 | 1/1/2016 1:33 | 4500 E 22nd ST | B | 1/1/2016 10:16 |
| 173827 | 1/1/2016 2:45 | 2230 W 45th ST | B | 1/1/2016 2:45 |
| 173828 | 1/1/2016 3:49 | 3215 W 23rd AVE | C | 2/4/2016 14:22 |

| DATE | N_MALICIOUS TOTAL | MALICIOUS TYPE A | MALICIOUS TYPE B | MALICIOUS TYPE C |
|---|---|---|---|---|
| 1/1/16 | 40 | 0 | 1 | 0 |
| 1/2/16 | 21 | 0 | 0 | 0 |
| 1/3/16 | 25 | 0 | 2 | 0 |
| 1/4/16 | 36 | 0 | 0 | 0 |
| 1/5/16 | 39 | 0 | 1 | 0 |

503

| MONTH | DAY OF WEEK | N_MALICIOUS TOTAL | MALICIOUS TYPE A | MALICIOUS TYPE B | MALICIOUS TYPE C |
|---|---|---|---|---|---|
| 1 | FRI | 37 | 1 | 2 | 0 |
| 1 | SAT | 43 | 1 | 3 | 0 |
| 1 | SUN | 23 | 2 | 2 | 0 |
| 1 | MON | 14 | 4 | 1 | 0 |
| 1 | TUE | 85 | 0 | 0 | 0 |

| DATE | N_MALICIOUS_TOTAL | MALICIOUS TYPE A | MALICIOUS TYPE B | MALICIOUS TYPE C | MEAN TEMPERATURE (F) | MEAN DEW POINT (F) | MEAN HUMIDITY (%) |
|---|---|---|---|---|---|---|---|
| 1/1/16 | 40 | 0 | 1 | 0 | 37 | 27 | 69 |
| 1/2/16 | 21 | 0 | 0 | 0 | 23 | 12 | 66 |
| 1/3/16 | 25 | 0 | 2 | 0 | 19 | 7 | 56 |
| 1/4/16 | 36 | 0 | 0 | 0 | 34 | 20 | 59 |
| 1/5/16 | 39 | 0 | 1 | 0 | 38 | 27 | 62 |

604

| MONTH | DAY OF WEEK | N_MALICIOUS_TOTAL | MALICIOUS TYPE A | MALICIOUS TYPE B | MALICIOUS TYPE C | MEAN TEMPERATURE (F) | MEAN DEW POINT (F) | MEAN HUMIDITY (%) |
|---|---|---|---|---|---|---|---|---|
| 1 | FRI | 37 | 1 | 2 | 0 | 37 | 27 | 69 |
| 1 | SAT | 43 | 1 | 3 | 0 | 23 | 12 | 66 |
| 1 | SUN | 23 | 2 | 2 | 0 | 19 | 7 | 56 |
| 1 | MON | 14 | 4 | 1 | 0 | 34 | 20 | 59 |
| 1 | TUE | 85 | 0 | 0 | 0 | 38 | 27 | 62 |

TRANSFORMING A TRANSACTIONAL DATA SET TO GENERATE FORECASTING AND PREDICTION INSIGHTS

BACKGROUND

The present disclosure relates to the field of computers, and particularly to computers that respond to information requests. Still more particularly, the present invention relates to transforming a transactional data set to generate prediction insights that are responsive to information requests.

SUMMARY

In one or more embodiments of the present invention, a method, system, and/or computer program product analyses event transactional related data to generate insights and predictions, which are pre-created to efficiently respond to requests for prediction/forecasting information, in order to improve the operation of the prediction-generating computer. One or more processors receive a series of structured data, where each entry ($E_i$) from the series of structured data has one or more time fields $T_k$ ($T_{i1}$, $T_{i2}$, ..., $T_{iK}$) and one or more attributes $A_j$ ($A_{i1}$, $A_{i2}$, ..., $A_{iJ}$). One or more processors analyze the series of structured data to determine if the series of structured data is transactional data that describes an operational event. One or more processors, in response to determining that the series of structured data is transactional data that describes an operational event, identify transactional data from the series of structured data. One or more processors select a time field $T_{kr}$ that meets an aggregation criterion, and then aggregate the continuous attributes and/or generate a new "count" field in the transactional data based on the time field $T_{kr}$ into a time series data format. One or more processors analyze the time series data by a time series analysis to create a forecast for a target series/field, where the forecast generates time-dependent forecasts, and where the time-dependent forecasts are generated for sequential occurrences of future values. One or more processors derive time related fields from the particular time field $T_{kr}$ with the one or more (continuous) attributes $A_j$ into a cross-sectional data format. One or more processors analyze the cross-sectional data by a regression analysis to create results used in a prediction of the future values, where the predictions of the future values are generated for sequential occurrences of future values. One or more processors transform the series of structured data to a cross sectional data format and then perform a regression analysis on the series of structured data in the cross sectional data format. One or more processors consolidate results from the time series analysis and the regression analysis to create a consolidated result. One or more processors receive a request for prediction/forecasting information from a requesting computer. One or more processors respond to the request by sending the consolidated results to the requesting computer.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
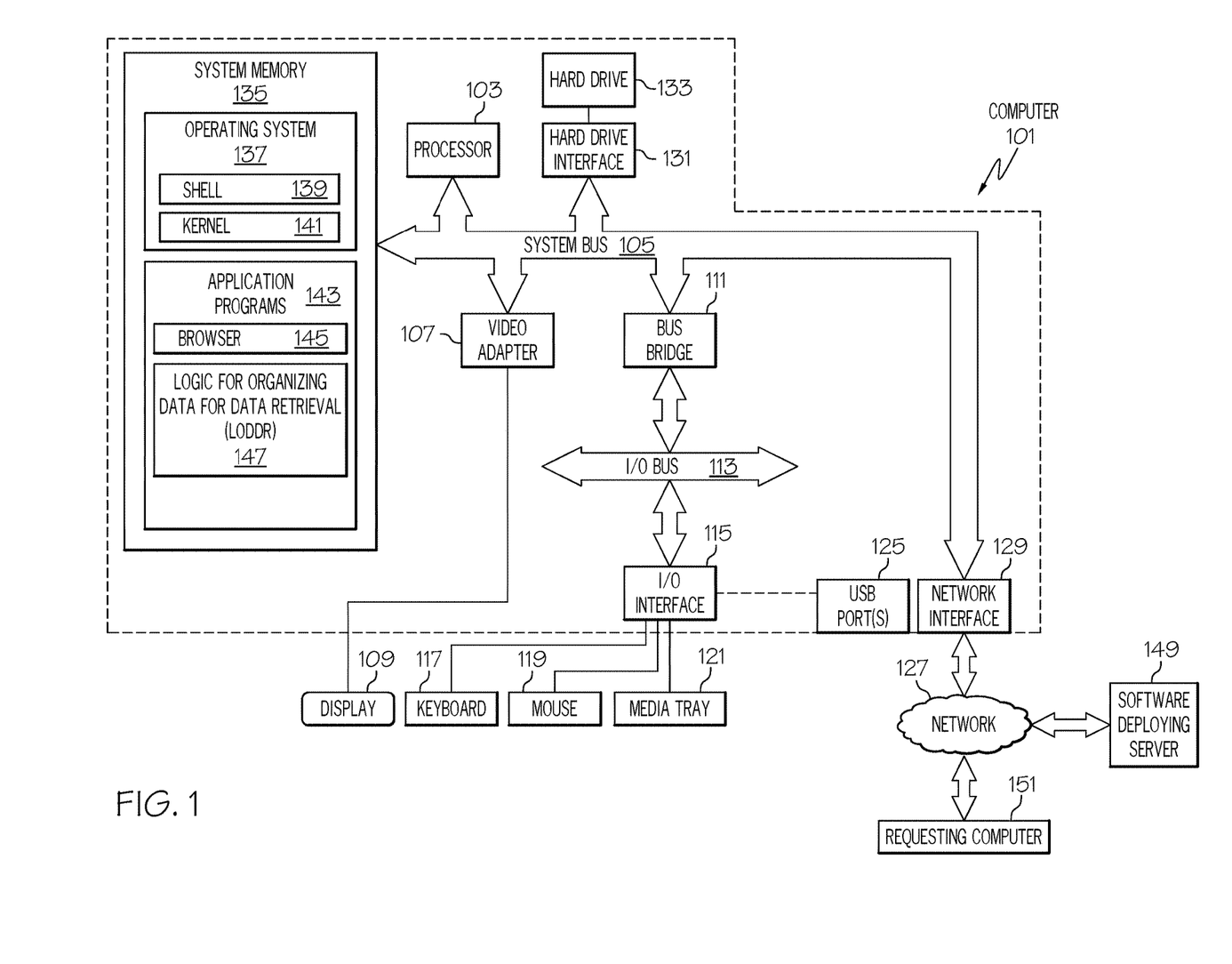
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or requesting computer 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., requesting computer 151) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Organizing Data for Data Retrieval (LODDR) 147. LODDR 147 includes code for implementing the processes described below, including those described in FIGS. 2-6. In one embodiment, computer 101 is able to download LODDR 147 from software deploying server 149, including in an on-demand basis, wherein the code in LODDR 147 is not downloaded until needed for execution. In one embodiment of the present invention, software deploying server 149 performs all of the functions associated with the present invention (including execution of LODDR 147), thus freeing computer 101 from having to use its own internal computing resources to execute LODDR 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Transactional data is a data format that presents analytic challenges to novice and advanced analysts alike. It also presents an opportunity to harvest insights from various perspectives. The analyst typically focuses on a particular analytic (e.g., forecasting) when faced with transactional data, and less commonly computes different types of analytics (e.g. forecasting and prediction). The present invention presents a system that transforms transactional data to generate a multitude of diverse insights and then displays them in a unified framework, which then can be used to efficiently and quickly respond to requests for prediction/forecasting information.

Transactional data is defined as data that describes an internal or external event that takes place as an enterprise conducts operations. A transaction can be financial, logistical, or any business-related process involving purchases, requests, insurance claims, deposits, withdrawals, or other activities, or it may be an event (such as a security event, etc.) that occurs within a city, state, etc.

Transactional data generally describes the time, place, and other information related to a particular event, usually at the point when it happened, rather than describing the object of the transaction (e.g., the product purchased or the identity of the customer). Thus transactional data contains a time field/dimension, which usually has a format of date, time, or datetime. But unlike regular (equally spaced) time series data, the time occurrence is irregular (not equally space; for example, not taken every hour) for transactional data. Similarly, transactional data might contain a space dimension, such as the location coordinates of the event, where the space occurrence is also irregular (not a predetermined set of lattices or fixed location points; for example, not occurring in every state).

Given a transactional data set, users in an organization are likely to compute some descriptive analytics and reporting but may not know which predictive analytics to use.

Some skilled analysts might know to aggregate the data into a regular time series data set. In this case, time series analysis can be performed on a target series (e.g., daily purchase values or hourly deposit amounts), and future target values can be forecast.

However, the target fields might not be obvious for some transactional data sets. For example, a malicious activity data set may describe when and where each malicious activity (event) happened along with the malicious activity type and its description, location and area description, and so forth, during a certain time span. Even after aggregation to regular time series data, none of the fields are apparent targets.

Rather, there is always a natural target for transactional data—namely, the total counts. The total counts give the number of point occurrences in each time interval. Thus, after aggregating malicious activity occurrences into daily malicious activity counts data, future malicious activity counts can be forecast using time series analysis.

Beyond forecasting, many analysts might not realize that transactional data can be transformed further to a cross-sectional data structure, in which the record sequence is irrelevant, so that regression analysis can be performed on the same targets. Analysts thus frequently miss out on the rich source of additional insights provided by regression analysis.

Performing both time series analysis (forecasting) and regression analysis (prediction) provides insights about different aspects of the transactional data. In particular:

Forecasting generates time-dependent insights (e.g., trends and seasonality); trends and seasonality that are stochastic or dynamic; and scores that depend on past history.

Prediction generates insights (e.g., drivers and profiles that need not be sequential or similarly time dependent); key drivers and profiles that are deterministic or static; and scores that depend on characteristics (i.e., if the characteristics are the same, then so too are the scores).

There currently exist no prior art systems that provide insights into both aspects of transactional data. For this reason, one or more embodiments of the present invention present a system that detects transactional data, transforms it to two data structures (time series and cross-sectional), computes total counts as one of the target fields, applies two predictive analytic methods (forecasting and prediction), generates insights from each analysis, and presents them through a consolidated visualization to help users, whether they are analysts or line of business users, understand their transactional data better.

Figure 2:
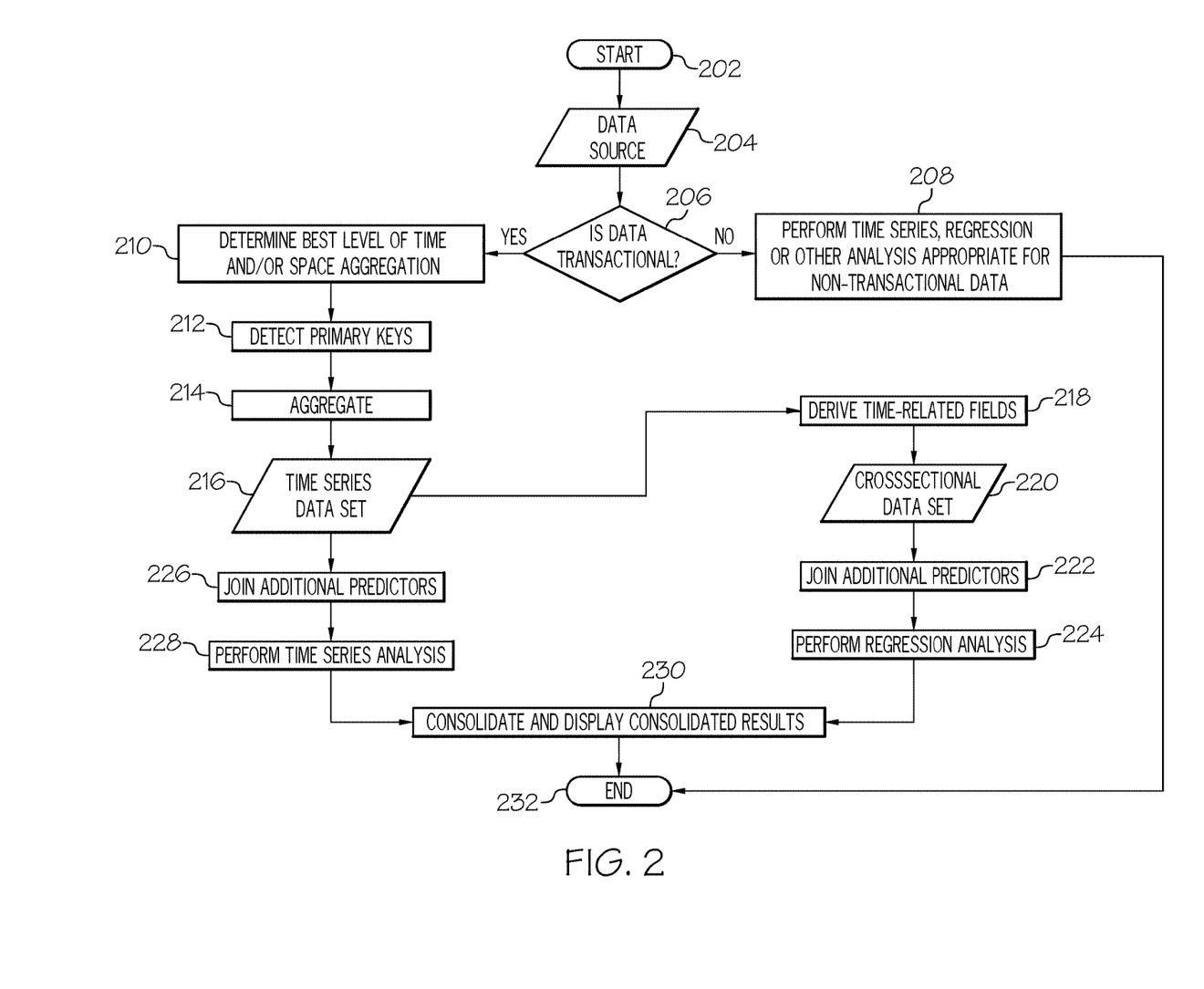
FIG. 2 is a high level illustration of a system for analyzing transactional data in accordance with one or more embodiments of the present invention.

The present invention proposes a system that transforms transactional data to generate a multitude of diverse insights by two types of predictive analytics and then displays them in a unified framework. With reference now to FIG. 2, a high level illustration of a system for analyzing transactional data in accordance with one or more embodiments of the present invention.

After initiator block 202, a data source 204 provides data to the system. The system queries whether or not the data is transactional data that describes an operational event (query block 206), where transactional data is defined as data that describes an internal or external event that takes place as an enterprise conducts operations. If not, then a timer series, regression or other type of analysis appropriate for non-transactional data is performed (block 208). Otherwise, the system determines the best level of time and/or space aggregation (i.e., selects certain groups of transactional data according to their occurrence temporal proximity and/or their occurrence spatial proximity), as shown in block 210. That is, events that occurred within a certain amount of time (temporal proximity) or at physical locations that are within a certain physical distance of one another (spatial proximity) are grouped together according to predetermined criteria (e.g., events that occur on the same day; events that occur within the same city, etc.).

As shown in block 212, primary keys are detected (i.e., which tags/metadata are to be used in the analysis according to predefined rules, decisions, algorithms, etc.) and data therefrom is aggregated together (block 214). This results in a time series data set 216, from which time-related fields are derived (block 218), leading to a cross-sectional data set 220. Additional predictors are then joined to the cross-sectional data set (block 222), such as weather factors, etc., and a regression analysis is performed (block 224) in order to generate a prediction.

Furthermore, the time series data set 216 has additional predictors attached thereto (block 226), and a time series analysis is performed (block 228), in order to generate a time-dependent forecasting. The results from these two analyses are combined for display as a consolidated result (block 230), and the flow-chart ends at terminator block 232.

Thus, the present invention provides the advantages of enabling two types of predictive analytics (time series and regression) to be applied to the transactional data after transformation/aggregation. Both time series and regression analyses thus discover different insights about the same underlying phenomena. Furthermore, insights are presented in a unified framework to help the user understand the data story from different perspectives. Also, automation of the data preparation stage saves the analyst's time, which is better spent understanding and applying analytic results. As a result, the automated process is less prone to error than the manual process, and the system does not require advanced knowledge of analytic methods by the user.

An overview of the present invention can be viewed according to the following 9 steps:

1. Detect whether a data set is transactional.
2. Discover the best level of aggregation based on time and/or space fields.
3. Detect the primary key(s) if exist.
4. Aggregate the transactional data set into a regular time series data structure.
5. Derive time-related fields for a cross-sectional data structure.
6. Join additional predictors from other data sets into both data structures.
7. Perform time series analysis (forecasting) for the time-series data.
8. Perform regression analysis (prediction) for the cross-sectional data.
9. Consolidate the results from the time series and regression analyses.

Figure 3:
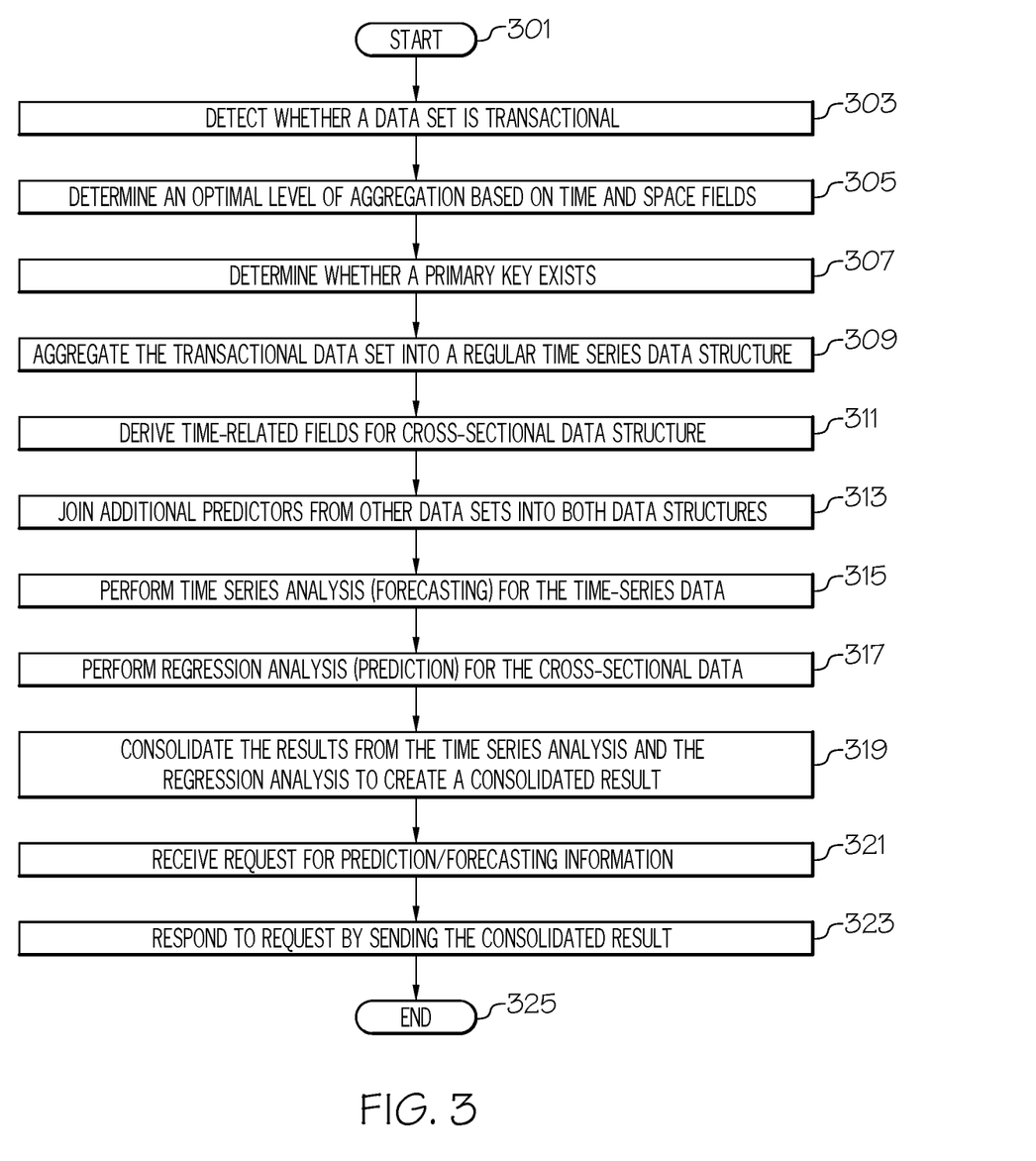
FIG. 3 is a high-level flow-chart of one or more steps performed by one or more computers and/or other hardware devices to improve the performance of a computer when responding to a request for prediction information in accordance with one or more embodiments of the present invention.

With reference now to FIG. 3, a high-level flow-chart of one or more steps performed by one or more computers and/or other hardware devices to improve the performance of a computer when responding to a request for prediction information in accordance with one or more embodiments of the present invention is presented.

1. Detect Whether a Data Set is Transactional—Block 303

After initiator block 301, one or more processors detect whether the data set is transactional (block 303). A transactional data set generally consists of a list of transactions or events labeled with a time stamp, and optionally the coordinates of the location of the event. Thus the data set will at least include the time field, which is formatted as a date, time, or datetime. In addition, time occurrences will be irregular (i.e., not equally spaced; for example, not taken every hour).

However, having a time field does not necessarily mean the data is transactional. An implementation might impose additional rules, such as:

Detection as transactional data requires that records are presorted in ascending or descending order of the time field values.

If at least one irregular time field in the data set satisfies the rule, then the data is detected as transactional and the user is asked to confirm.

Figure 4:
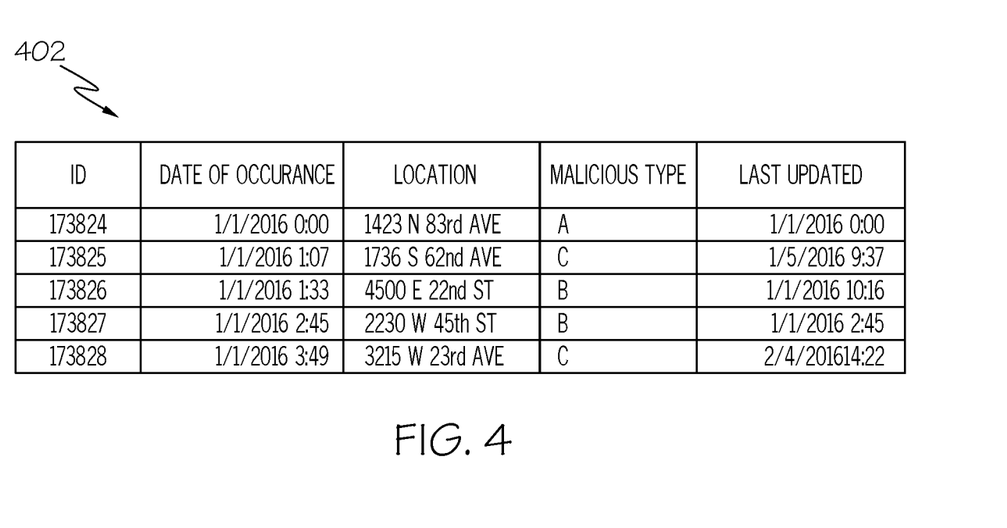
FIGS. 4-6 depict various data formats and/or tables used with one or more embodiments of the present invention.

For example, in FIG. 4, table 402 shows the field names and the first five records of the malicious activity data set. Two of the fields may be identified as time fields (e.g., "Date of Occurrence" and "Last Updated", where the former is the date of the event occurrence and the latter is the date that the record was last updated). The "Date of Occurrence" field may be presorted in ascending order, so (based on a heuristic) the data set is detected as transactional and a time interval is computed based on the "Date of Occurrence".

The other time field, "Last Updated", may be ignored.

The table may also have fields of interest, such as where the events occurred (e.g., geographic coordinates such as latitude and longitude coordinates). Other fields (e.g. Type of event, Description of event, etc.) may be assessed in subsequent steps.

2. Discover/Determine the Best Level of Aggregation—Block 305

As depicted in block 305 in FIG. 3, this step automates the creation of the time and space aggregates, so that the transactional data can be transformed to regular time series data. The time and space aggregation selects a time interval that is equally spaced (e.g., days, months, or years) and a space interval which is usually a spatial lattice (e.g., precincts, counties, states, or countries). That is, the system selects the smallest candidate time interval and/or spatial lattice such that most intervals or lattices, or combinations, will have an adequate number of transactions/events after aggregation.

If space fields are unavailable, then find the best level of aggregation for time only—e.g. using the following approach and/or the process described in U.S. patent application Ser. No. 14/884,468, entitled "Automatic Time Interval Metadata Determination for Business Intelligence and Predictive Analytics", filed on Oct. 15, 2015, and incorporated by reference herein in its entirety.

A time interval metadata determining system may determine a time interval for irregular time variables. In these cases, where the time variable is irregular and has no intrinsic time interval, the time interval metadata determining system may determine a most plausible time interval.

This time interval metadata determining system may select the smallest candidate time interval with a density of bins that is larger than a threshold value as the suggested time interval for irregular time variable, where the density of bins denotes the ratio of non-missing bins to all bins constructed based the time interval given.

To perform a process to determine a most plausible time interval, the time interval metadata determining system may set the difference between two connected time points $\Delta^i = t_{i+1} - t_i$, $i \in [1, n-1]$, where n is the number of distinct time points, and set $\Delta_\alpha$ as the $\alpha$-th percentile of the set $\{\Delta^i, 0 \le i < n\}$, where the default $\alpha = 90$. The time interval metadata determining system may first determine $\Omega_\alpha$, the set of time intervals that are equal to or larger than $\Delta_\alpha$, from various types of time intervals. For time intervals of type "Seconds", "Minutes", "Hours", "Days", "Months", and "Years", the time interval metadata determining system may set their increment parameter to 1. For "Days", the time interval metadata determining system may set two additional parameters of intermittency: the number of days per week $n_d = 7$ and the beginning of the week $W_{start} = 0$ (Sunday) initially. For "Seconds", "Minutes", or "Hours", the time interval metadata determining system may set two more parameters of intermittency: the number of hours per day $\eta_h = 24$ and the beginning of the day $D_{start} = 0$ (midnight) initially.

Then, for each time interval j in $\Omega_\alpha$, the time interval metadata determining system may construct the bins between the beginning and ending time of the sample, and assign time points to the bins. The time interval metadata determining system may then determine the density of the bins as:

$$\rho_j = nn_j / NN_j$$

which may be defined as the number of non-missing bins ($nn_j$) divided by the total number of bins (Mg. For applicable cases, the time interval metadata determining system may modify the density by subtracting invalid bins, $NN_{0,j}$, from $NN_j$:

$$\rho_j = nn_j / (NN_j - N_{0,j})$$

For "Days", the time interval metadata determining system may apply the method described in the same U.S. patent application Ser. No. 14/884,469 to adjust $n_d$ and $W_{start}$. The time interval metadata determining system may reject bins that are outside of [$W_{start}$, $W_{start} + n_d$] as invalid. For "Seconds", "Minutes" or "Hours", the time interval metadata determining system may apply the methods described in the same U.S. patent application Ser. No. 14/884,469 to adjust $n_d$, $W_{start}$, $n_h$, and $D_{start}$. The time interval metadata determining system may reject bins that are outside of [$W_{start}$, $W_{start} n_d$] or [$D_{start}$, $D_{start} + n_h$], as invalid. The time interval metadata determining system may then identify and output the smallest time interval with a density equal to or larger than $\beta$ (=90%, for example). The time interval metadata determining system may output the parameters attached to the time interval, if any. Thus, determining the parameters of intermittency for the time variable may include determining that the time variable is irregular, and determining a smallest candidate time interval with a density of bins that is larger than a threshold value as the time interval for the irregular time variable.

The basic idea is to select the smallest candidate time interval, with a density of bins that is larger than a threshold value, as the suggested time interval for the irregular time field. If space fields are available, then find the best level of aggregation for time and space using the same idea.

In general, the choice of the lattice is guided by the context of the data. It may be defined based on political boundaries (e.g., precincts, countries) or another predefined partition of the spatial domain. Hence it should be chosen first by the system. Then, point occurrences are aggregated to counts within each lattice. After the space interval is chosen, the time interval can be chosen based on the idea described above.

Assume now that the transactional data describes a malicious activity within a certain city. The malicious activity data set includes the coordinates where each malicious activity happened (Latitude, Longitude, X Coordinate, Y Coordinate), and also includes several geospatial fields: district, ward, community area, and malicious activity identification code.

These fields are all natural space intervals/lattices. Assume now that the system selects a particular geographic field (e.g., a district field) as the aggregation level. Given the district field as the space interval, the method described above will suggest "Days" (e.g., Monday, Tuesday, etc.) as the most plausible time interval for that district.

3. Detect the Primary Key(s)—Block 307

This step detects the primary keys and constructs targets and/or predictors based on the keys along with the time and space aggregates.

A key is a categorical field that defines the nature of each transaction/event in the transactional data set.

Accurate detection of keys requires domain knowledge. In practice, a heuristic such as the following could select possible keys and an analyst would adjust the selection as needed. That is, the system may 1) consider all string fields; 2) rule out record ID and demographic fields; 3) count the number of categories in each remaining string field; and 4) sort the fields in ascending order of number of categories.

Keys are used to construct the targets. That is, if there are zero keys, then a target can be computed as the total number of transactions (total counts) within each time aggregate, or time and space aggregate. If there is one primary key, then in addition to computing the total number of transactions within each aggregate, a target can be computed as the number of transactions for each key category within each aggregate.

If there are multiple keys with a hierarchical relationship (e.g., a secondary key nested within a primary key), a target can be computed as the number of transactions for each key category combination within each aggregate.

The present invention focuses on count targets because it will always be possible to construct a count target from a transactional data set by computing the total number of transactions within each aggregate.

However, this disclosure is not limited to count targets but can include other continuous fields as targets.

Depending on semantic meaning (based on metadata), in one or more embodiments of the present invention the system will use a different aggregate function, such as the sum, average, minimum, or maximum for different continuous fields.

Applying the above heuristic to the malicious activity data yields three possible keys: Primary Type, Location Description, and Description.

Primary Type has the smallest number of categories (e.g., 33), and thus the system will choose it as the key.

Targets are constructed by computing the total count and a count of each of the (e.g., 33) categories of Primary Type, for a total of 34 targets.

4. Aggregate the Transactional Data Set into Time Series Data—Block 309

With reference now to FIG. 4, and particularly table 402, the first five records of the aggregate data set (i.e., malicious types described as Malicious Types A-C from the data obtained in the process described above) for a certain location is presented. Assume that the aggregate data set for this location (and for other locations) contains 1,176 records corresponding to the 1,176 days in the original transactional data. Thus, "Date" is the time field, "N_Malicious Total" is the total count field for a particular date (e.g., there were 40 malicious events that occurred in the district on Jan. 1, 2016); and fields "Malicious Type A" through "Malicious Type C" are the count fields for responding (i.e., the transaction event) to the various malicious types (from a total of 33 such fields, of which only 3 are depicted in this data set).

5. Derive Time-Related Fields for Cross-Sectional Data—Block 311

This step uses the Time field in the time series data structure to derive additional time-related fields (e.g., Day, Month, Weekday, and Hour), depending on the level of aggregation for time, for use in prediction.

From this point forward in the described process, the time series (Forecasting) and cross sectional (Prediction) data structures differ. That is, the Forecasting data set (e.g., table 501 shown in FIG. 5) includes the Time ("Date") field but the Prediction data set (e.g., table 503 shown in FIG. 5) does not.

Figure 5:
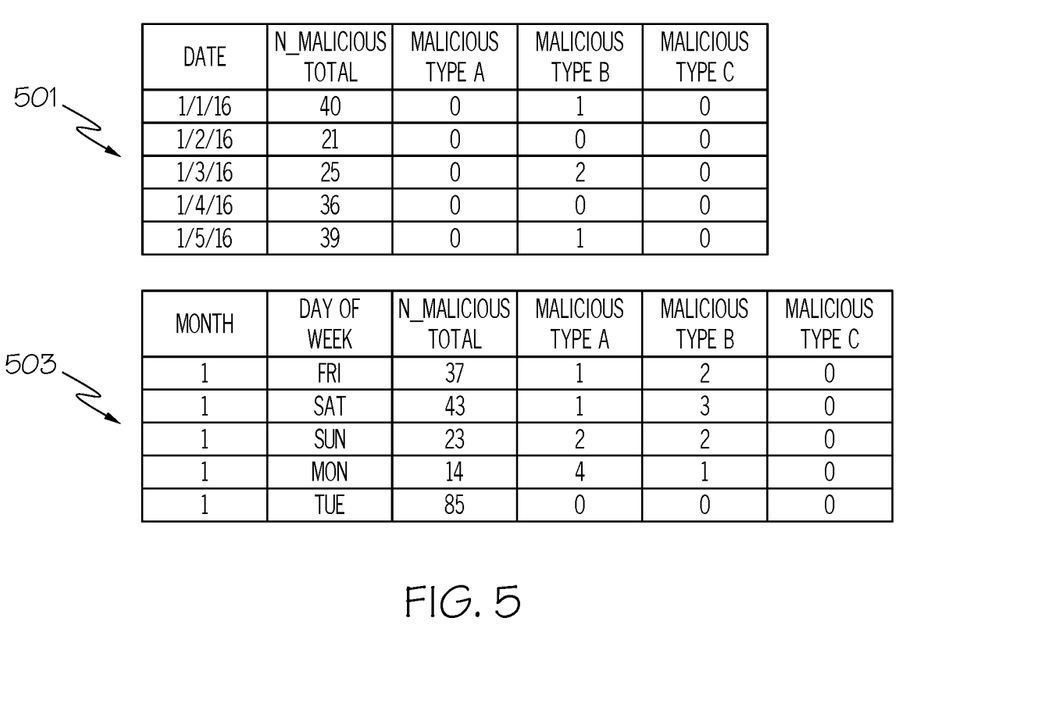

Time indicates the sequential order of the records in the Forecasting data set (table 501). However, the absence of the Time/Date field in the Prediction data set (table 503) suggests that if we move the first row of data (1, Fri, 37, 1, 2, 0) to after the $5^{th}$ row of data (1, Tue, 85, 0, 0, 0), the results would not be different for prediction. Thus, records may be randomly re-ordered without impacting the analytic results.

For the prediction data set (table 503), the fields "Month" and "Day of Week" are derived from the "Date" in the Forecasting data set (table 501), and the field "Date" is removed from table 503.

6. Join Additional Predictors into Both Data Structures—Block 313

This step (optional in one or more embodiments of the present invention) joins additional predictors from external appropriately-aggregated data sets.

Figure 6:
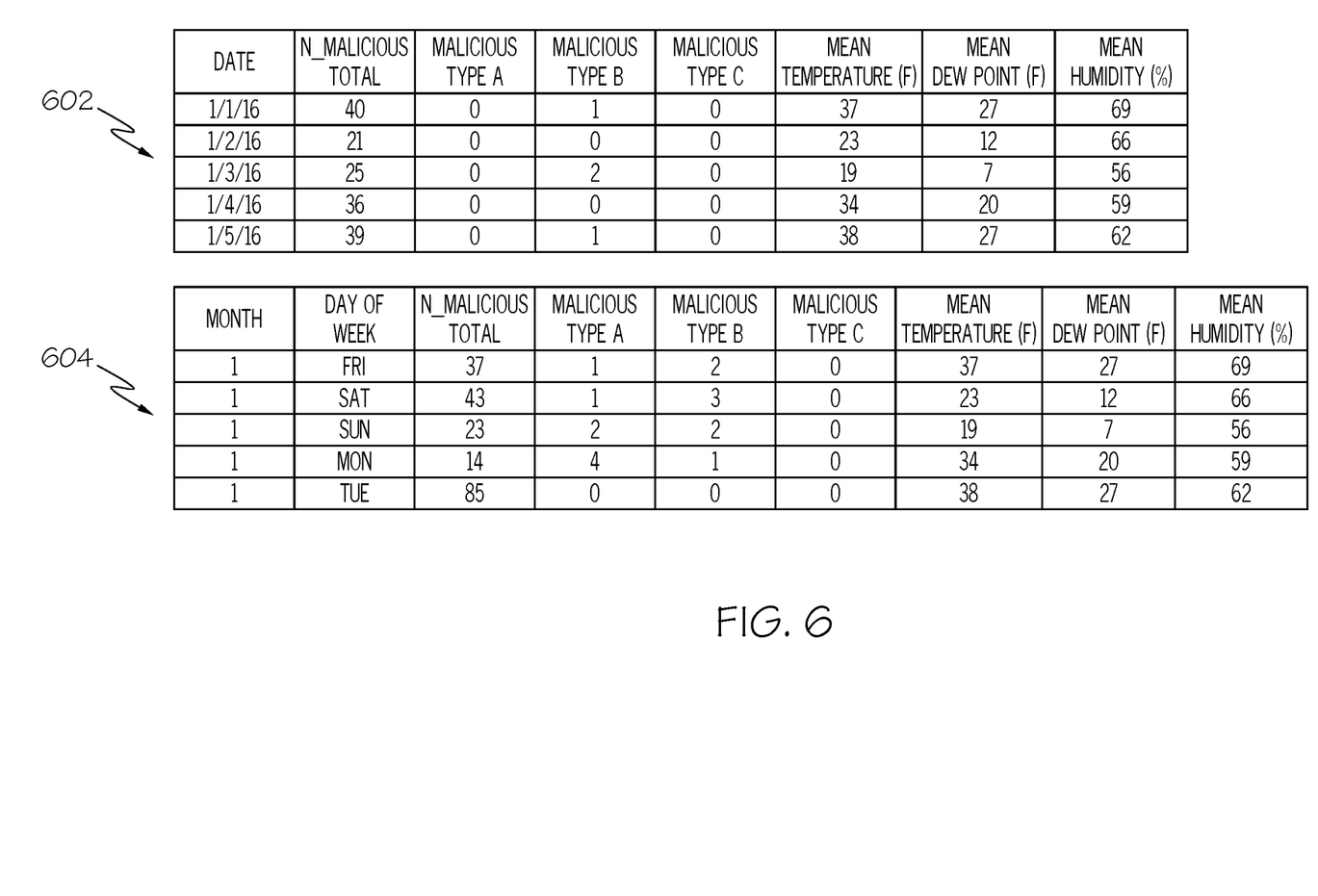

For the malicious activity data, some weather-related predictors, such as "Mean Temperature", "Mean Dew Point", "Mean Humidity", etc., are joined, as shown in table 602 in FIG. 6 (for the forecasting data set) and in table 604 in FIG. 6 (for the prediction data set).

7. Perform Time Series Analysis—Block 315

The system then performs a time series analysis (forecasting) on the time series data set. A wide range of methods are available for this analysis, including but not limited to: Univariate time series (e.g., exponential smooth models, autoregressive integrated moving average (ARIMA) models); methods with predictor series (e.g., transfer function models, temporal causal modeling model); and/or multivariate time series (e.g., vector autoregressive (VAR) models, multivariate ARIMA models).

Applying an ARIMA model to the forecasting data set for the district yields an insight about seasonality in the total malicious activity count. For example, a closer inspection of the data reveals that the total number of malicious activities peaks each summer and then declines.

8. Perform Regression Analysis—Block 317

The system then performs a regression analysis (prediction) on the cross sectional data set. For count targets, Poisson or negative binomial regression can be performed.

More generally, the generalized linear model can be used, with appropriate probability distribution determined by the target's measurement level and storage type, and link function determined by the target's distribution.

Potential predictors include the derived time-related fields, other predictors, and joined predictors.

Applying a Poisson regression model to the prediction data set for the district from which the data in the transactional data set occurred yields an insight about the "Mean Temperature" by "Mean Dew Point" interaction. While the total number of malicious activities increases with the average temperature and dew point, it is considerably higher when the average temperature and dew point are both high.

9. Consolidate the Results—Block 319

The system then brings the insights from the two data formats together so that the system can create a unified story.

Time series and regression analyses offer different perspectives of the same underlying data, similar to how top-down/bottom-up window shades allow different perspectives of the same landscape.

The window shades metaphor suggests a similar layout for consolidating the results in one view. Beginning with a view of the original transactional data set, a top-down shade might be drawn down to reveal the time series perspective, and a bottom-up shade might be drawn up to reveal the regression perspective.

Once the consolidated result is created, it is then stored in order to respond to requests for this specific data set. That is, assume that a prediction generating computer (e.g., computer 101 shown in FIG. 1) receives a request for prediction/forecasting information from a requesting computer (e.g., requesting computer 151 shown in FIG. 1), as described in block 321 in FIG. 3. Computer 101 will have the consolidated information already stored, tagged, and identified to match this type of prediction request (e.g., a request for a prediction of how many future malicious events will occur within the same district in the next seven days).

As described in block 323, computer 101 will then respond to the request from requesting computer 151 by sending the consolidated result to the requesting computer 151, and the flow-chart ends at terminator block 325.

Thus, as described herein, a method for analyzing event transactional related data to generate insights and predictions, and storing them to respond to requests for prediction/forecasting information, includes the feature described in block 303 of receiving, by one or more processors, a series of structured data, wherein each entry (Ei) from the series of structured data has one or more time fields $T_k$ ($T_{i1}$, $T_{i2}$, ... , $T_{iK}$) and one or more attributes $A_j$ ($A_{i1}$, $A_{i2}$, ..., $A_{iJ}$); analyzing, by one or more processors, the series of structured data to determine if the series of structured data is transactional data that describes an operational event; and in response to determining that the series of structured data is transactional data that describes an operational event, identifying transactional data from the series of structured data.

As described in blocks 305-313, one or more processors select a time field $T_{kr}$ that meets an aggregation criterion, and then aggregate the continuous attributes and/or generate a new "count" field in the transactional data based on the time field $T_{kr}$ into a time series data format, as described above.

As described in block 315, one or more processors analyze the time series data by a time series analysis to create a forecast, where the forecast generates time-dependent forecasts, and where the time-dependent forecasts are based on sequential occurrences of future values, and where the processor(s) derive time related fields from the time field $T_{kr}$ with the one or more attributes Aj into a cross-sectional data format (e.g., see table 501 in FIG. 5).

As described in block 317, one or more processors analyze the cross-sectional data by a regression analysis to form results used in a prediction of the future events, where the predictions of the future events are predictions that are based on sequential occurrences of the future events (e.g., see table 503 in FIG. 5).

As described in block 319, one or more processors consolidate results from the time series analysis and the regression analyses to create a consolidated result (e.g., a combination of predictions/forecasts derived from table 501 and table 503).

As described in block 321, one or more processors subsequently receive a request for prediction/forecasting information from a requesting computer.

As described in block 323, one or more processors then respond to the request by sending the consolidated results to the requesting computer.

In an embodiment of the present invention, the attributes $A_j$ are selected from a group consisting of labels, strings, location, numbers, counts, and statistics for data in the structured data.

In an embodiment of the present invention, the transactional data set is identified as being transactional in nature based on whether a time field is in chronological order for entries in the data set (for example, see table 402 in FIG. 4). That is, in one embodiment of the present invention, only data that is arranged in temporally sequential order is deemed to be transactional, since such data can be presumed to be stored/consolidated as events occur.

In an embodiment of the present invention, one or more processors utilize natural language processing (NLP) to determine one or more primary keys in the transactional data, and then construct target fields from the primary key, where the target fields are used for the time series analysis and the regression analysis. That is, NLP evaluates the transactional data to identify which field (e.g., location, etc.) should be used as a primary key, from which the prediction/forecasting described herein is based.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
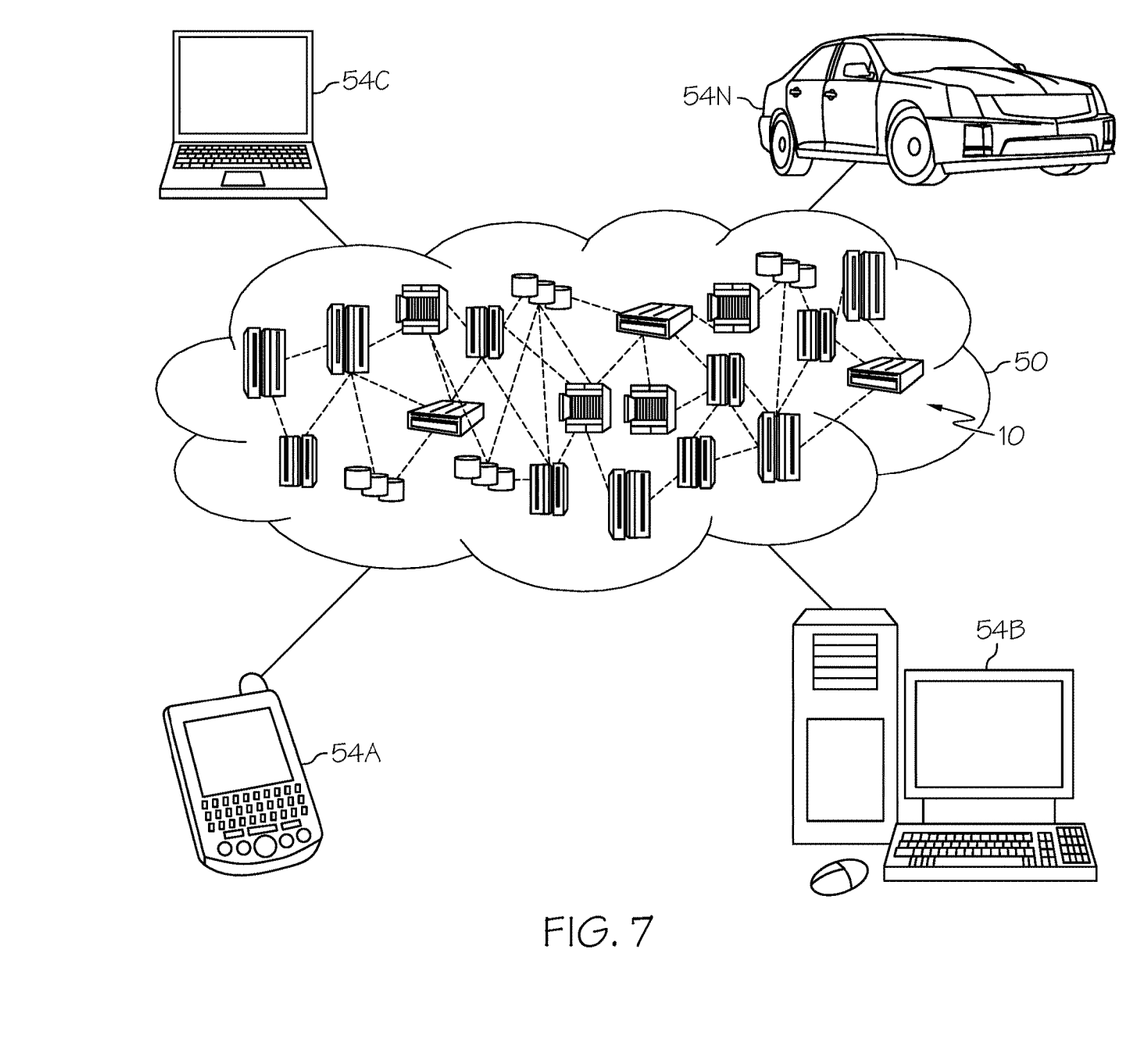
FIG. 7 depicts a cloud computing environment according to an embodiment of the present invention.
Figure 8:
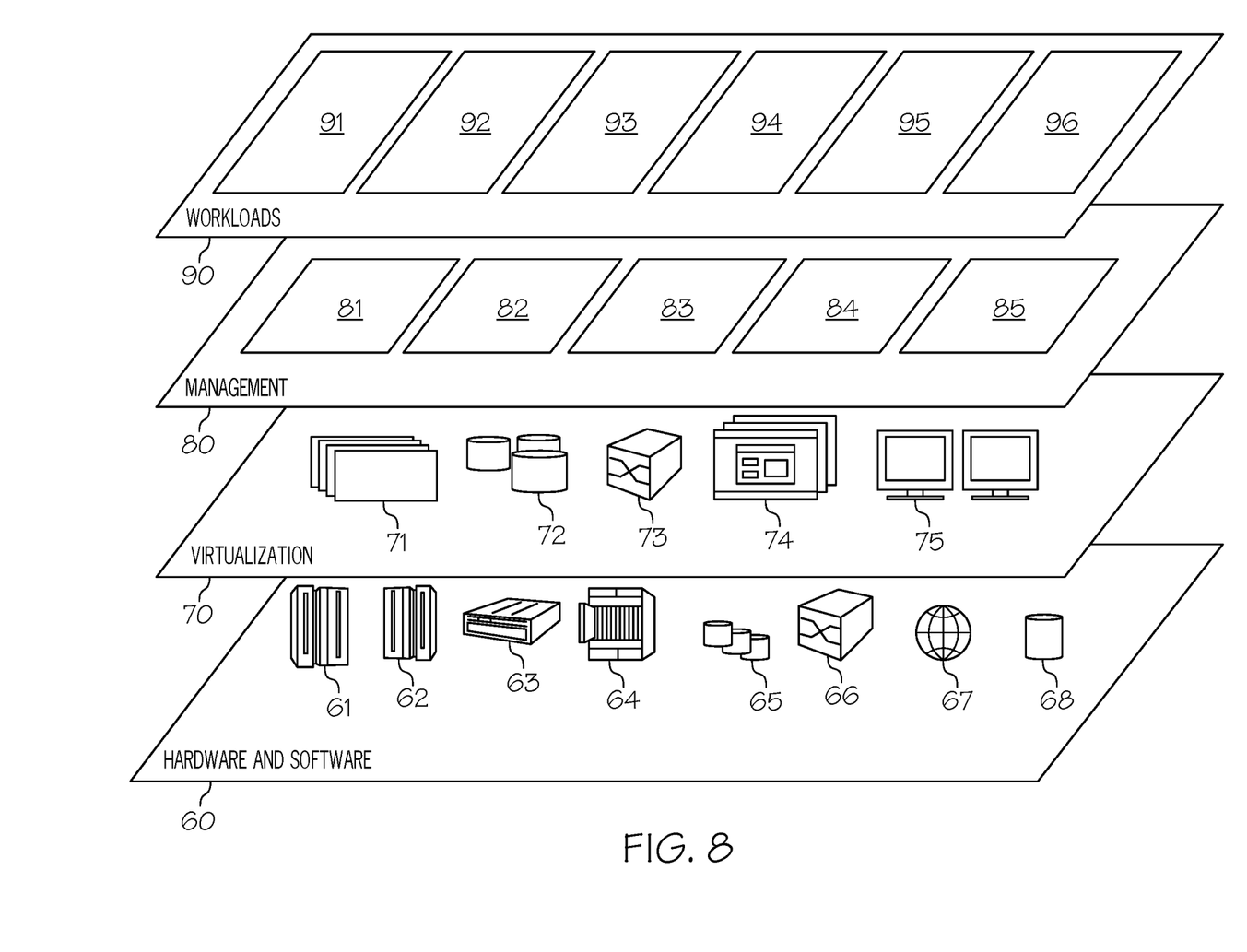
FIG. 8 depicts abstraction model layers of a cloud computing environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transactional data processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, a series of structured data, wherein each entry from the series of structured data has one or more time fields and one or more attributes, wherein the one or more time fields identify a date of occurrence of an operational event, and wherein the series of structured data comprises one or more time variables in a time series data set;
   aggregating, by one or more processors, transactional data from the one or more time fields into time series data;

analyzing, by one or more processors, the time series data by a time series analysis to create a time-dependent forecast of sequential occurrences of future malicious events, wherein the time-dependent forecast generates time-dependent insights about the time series data;

transforming, by one or more processors, time related fields from the one or more time fields with the one or more attributes into cross-sectional data in a cross-sectional data format, wherein the cross-sectional data format is a single table that represents rows of the time related fields and columns of the one or more attributes;

analyzing, by one or more processors, the cross-sectional data by a regression analysis to form results used in a time-independent prediction of the future malicious events, wherein the time-independent prediction generates insights that are not time dependent;

consolidating, by one or more processors, results from the time series analysis and the regression analysis to create a consolidated result, wherein the consolidated result describes both the time-dependent forecast of the sequential occurrences of the future malicious events and the time-independent prediction of the future malicious events;

storing, by one or more processors, the consolidated result as a stored consolidated result in a consolidated result-generating computer;

receiving, by one or more processors, a request for prediction information about the future malicious events from a requesting computer, wherein the request is received after the consolidated result is created and stored in the consolidated result-generating computer;

responding, by one or more processors, to the request by sending the stored consolidated result via a network from the consolidated result-generating computer to the requesting computer, wherein the consolidated result provides both time-dependent forecast information and time-independent prediction information to the requesting computer, wherein the stored consolidated result is pre-created and stored in the consolidated result-generating computer, and wherein pre-creating and storing the stored consolidated result improves a performance of the consolidated result-generating computer by reducing an amount of time required by the consolidated result-generating computer to respond to the request;

extracting, by one or more processors, a sample of time values of a particular time variable of the one or more time variables from the time series data set;

determining, by one or more processors and based at least in part on the sample of time values, that the one or more time variables are intermittently regular with one or more intervals of interruption;

determining, by one or more processors, one or more respective time intervals for the one or more time variables;

determining, by one or more processors, parameters of intermittency for the one or more time variables, wherein the parameters characterize the one or more intervals of interruption;

generating, by one or more processors, an output comprising information about the one or more time variables based on the one or more respective time intervals and the parameters of intermittency for the one or more time variables;

determining, by one or more processors and based on the output, one or more subsets of the time series data set, wherein the one or more subsets of the time series data set are each associated with a regular interval;

performing, by one or more processors, time series modeling and analysis operations on the one or more subsets of the time series data set; and outputting and transmitting, by one or more processors, at least one data visualization associated with the time series modeling and the analysis operations to the requesting computer.

2. The method of claim 1, wherein each of the attributes is from a group consisting of labels, strings, location, numbers, counts, and statistics for data in the structured data.

3. The method of claim 1, wherein the transactional data is identified as being transactional in nature based on whether the time field is in chronological order for entries in the structured data.

4. The method of claim 1, further comprising:

generating, by one or more processors, primary keys used in said analyzing the series of structured data by:

retrieving all string fields in the series of structured data;

excluding any record identifier and demographic field from said all string fields in the series of structured data to define remaining string fields as primary keys;

counting a quantity of categories in each of the remaining string fields;

sorting the remaining string fields in ascending order of the quantity of categories in each of the remaining fields; and identifying a primary key as a remaining string field that has a smallest number of categories as compared with other remaining fields;

identifying, by one or more processors, a target field used for the time series analysis and the regression analysis, wherein the target field is associated with the primary key; and generating, by one or more processors, the prediction information about the future malicious events by applying the target field to the time series analysis and the regressions analysis.

5. A computer program product comprising one or more computer readable storage mediums, and program instructions stored on at least one of the one or more storage mediums, the stored program instructions comprising:

program instructions to receive a series of structured data, wherein the series of structured data comprises one or more time variables in a time series data set, wherein each entry from the series of structured data has one or more time fields and one or more attributes, wherein the one or more time fields identify a date of occurrence of an operational event, wherein the one or more attributes comprise descriptions of past malicious activities, wherein the past malicious activities have been previously identified as being malicious, and wherein the one or more attributes comprise a description of weather conditions at a time of the operational event;

program instructions to analyze the series of structured data to determine if the series of structured data is transactional data that describes the operational event, wherein the transactional data describes locations where the past malicious activities occurred;

program instructions to determine that the series of structured data is transactional data that describes an operational event;

program instructions to select a time field, from the one or more time fields, that meets an aggregation criterion;

program instructions to aggregate the transactional data from the time field that meets the aggregation criterion into time series data;

program instructions to analyze the time series data by a time series analysis to create a prediction forecast of events, and wherein the events are sequential occurrences of future events;

program instructions to transform time related fields from the time field with the one or more attributes into cross-sectional data in a cross-sectional data format, wherein the cross-sectional data format is a single table that represents rows of the time related fields and columns of the one or more attributes;

program instructions to analyze the cross-sectional data by a regression analysis to form results used in a further prediction of the sequential occurrences of the future malicious events;

program instructions to consolidate results from the time series analysis and the regression analysis to create a consolidated result, wherein the consolidated result describes the prediction of the sequential occurrences of the future malicious events;

program instructions to store the consolidated result as a stored consolidated result in the consolidated result-generating computer;

program instructions to receive a request for prediction information about the future malicious events from a requesting computer, wherein the request is received after the consolidated result is created and stored in the consolidated result-generating computer;

program instructions to the request by sending the stored consolidated result from the consolidated result-generating computer to the requesting computer, wherein the stored consolidated result is pre-created and stored in the consolidated result-generating computer in order to respond to the request for prediction information about the future malicious events and to improve a performance of the consolidated result-generating computer by reducing an amount of time required by the consolidated result-generating computer to respond to the request;

program instructions to extract a sample of time values of a particular time variable of the one or more time variables from the time series data set;

program instructions to determine, based at least in part on the sample of time values, that the one or more time variables are intermittently regular with one or more intervals of interruption;

program instructions to determine one or more respective time intervals for the one or more time variables;

program instructions to determine parameters of intermittency for the one or more time variables, wherein the parameters characterize the one or more intervals of interruption;

program instructions to generate an output comprising information about the one or more time variables based on the one or more respective time intervals and the parameters of intermittency for the one or more time variables;

program instructions to determine, based on the output, one or more subsets of the time series data set, wherein the one or more subsets of the time series data set are each associated with a regular interval;

program instructions to perform time series modeling and analysis operations on the one or more subsets of the time series data set; and program instructions to output and transmit, to the requesting computer, at least one data visualization associated with the time series modeling and the analysis operations.

6. The computer program product of claim 5, wherein each of the attributes is from a group consisting of labels, strings, location, numbers, counts, and statistics for data in the structured data.

7. The computer program product of claim 5, wherein the transactional data is identified as being transactional in nature based on whether the time field is in chronological order for entries in the structured data.

8. The computer program product of claim 5, wherein the stored program instructions further comprise:

program instructions to generate primary keys used in said analyzing the series of structured data by:
retrieving all string fields in the series of structured data;
excluding any record identifier and demographic field from said all string fields in the series of structured data to define remaining string fields as primary keys;
counting a quantity of categories in each of the remaining string fields;
sorting the remaining string fields in ascending order of the quantity of categories in each of the remaining fields; and
identifying a primary key as a remaining string field that has a smallest number of categories as compared with other remaining fields;

program instructions to identify a target field used for the time series analysis and the regression analysis, wherein the target field is associated with the primary key; and program instructions to generate the prediction information about the future malicious events by applying the target field to the time series analysis and the regressions analysis.

9. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to receive a series of structured data, wherein the series of structured data comprises one or more time variables in a time series data set, wherein each entry from the series of structured data has one or more time fields and one or more attributes, wherein the one or more time fields identify a date of occurrence of an operational event, wherein the one or more attributes comprise descriptions of past malicious activities, wherein the past malicious activities have been previously identified as being malicious, and wherein the one or more attributes comprise a description of weather conditions at a time of the operational event;

program instructions to analyze the series of structured data to determine if the series of structured data is transactional data that describes the operational event, wherein the transactional data describes locations where the past malicious activities occurred;

program instructions to determine that the series of structured data is transactional data that describes an operational event;

program instructions to select a time field, from the one or more time fields, that meets an aggregation criterion;

program instructions to aggregate the transactional data from the time field that meets the aggregation criterion into time series data;

program instructions to analyze the time series data by a time series analysis to create a prediction forecast of events, and wherein the events are sequential occurrences of future events;

program instructions to transform time related fields from the time field with the one or more attributes into cross-sectional data in a cross-sectional data format, wherein the cross-sectional data format is a single table that represents rows of the time related fields and columns of the one or more attributes;

program instructions to analyze the cross-sectional data by a regression analysis to form results used in a further prediction of the sequential occurrences of the future malicious events;

program instructions to consolidate results from the time series analysis and the regression analysis to create a consolidated result, wherein the consolidated result describes the prediction of the sequential occurrences of the future malicious events;

program instructions to store the consolidated result as a stored consolidated result in the consolidated result-generating computer;

program instructions to receive a request for prediction information about the future malicious events from a requesting computer, wherein the request is received after the consolidated result is created and stored in the consolidated result-generating computer;

program instructions to the request by sending the stored consolidated result from the consolidated result-generating computer to the requesting computer, wherein the stored consolidated result is pre-created and stored in the consolidated result-generating computer in order to respond to the request for prediction information about the future malicious events and to improve a performance of the consolidated result-generating computer by reducing an amount of time required by the consolidated result-generating computer to respond to the request;

program instructions to extract a sample of time values of a particular time variable of the one or more time variables from the time series data set;

program instructions to determine, based at least in part on the sample of time values, that the one or more time variables are intermittently regular with one or more intervals of interruption;

program instructions to determine one or more respective time intervals for the one or more time variables;

program instructions to determine parameters of intermittency for the one or more time variables, wherein the parameters characterize the one or more intervals of interruption;

program instructions to generate an output comprising information about the one or more time variables based on the one or more respective time intervals and the parameters of intermittency for the one or more time variables;

program instructions to determine, based on the output, one or more subsets of the time series data set, wherein the one or more subsets of the time series data set are each associated with a regular interval;

program instructions to perform time series modeling and analysis operations on the one or more subsets of the time series data set; and program instructions to output and transmit, to the requesting computer, at least one data visualization associated with the time series modeling and the analysis operations.

10. The computer system of claim 9, wherein the attributes are selected from a group consisting of labels, strings, location, numbers, counts, and statistics for data in the structured data.

11. The computer system of claim 9, wherein the transactional data is identified as being transactional in nature based on whether the time field is in chronological order for entries in the structured data.

12. The computer system of claim 9, wherein the stored program instructions further comprise:

program instructions to generate primary keys used in said analyzing the series of structured data by:
retrieving all string fields in the series of structured data;
excluding any record identifier and demographic field from said all string fields in the series of structured data to define remaining string fields as primary keys;
counting a quantity of categories in each of the remaining string fields;
sorting the remaining string fields in ascending order of the quantity of categories in each of the remaining fields; and
identifying a primary key as a remaining string field that has a smallest number of categories as compared with other remaining fields;

program instructions to identify a target field used for the time series analysis and the regression analysis, wherein the target field is associated with the primary key; and program instructions to generate the prediction information about the future malicious events by applying the target field to the time series analysis and the regressions analysis.

13. The method of claim 1, further comprising:

applying, by one or more processors, a Poisson regression model to the series of structured data to determine an effect of a mean temperature and a mean dew point of the weather conditions at the time of the operational event, wherein the Poisson regression model shows that a total number of the past malicious activities increased with an increase in both the mean temperature and the mean dew point; and adjusting, by one or more processors, the consolidated result based on the effect of the mean temperature and the mean dew point of the weather conditions at the time of the operational event.

* * * * *